(No Model.)
L. KATZENSTEIN.
STUFFING BOX.
No. 538,681. Patented May 7, 1895.
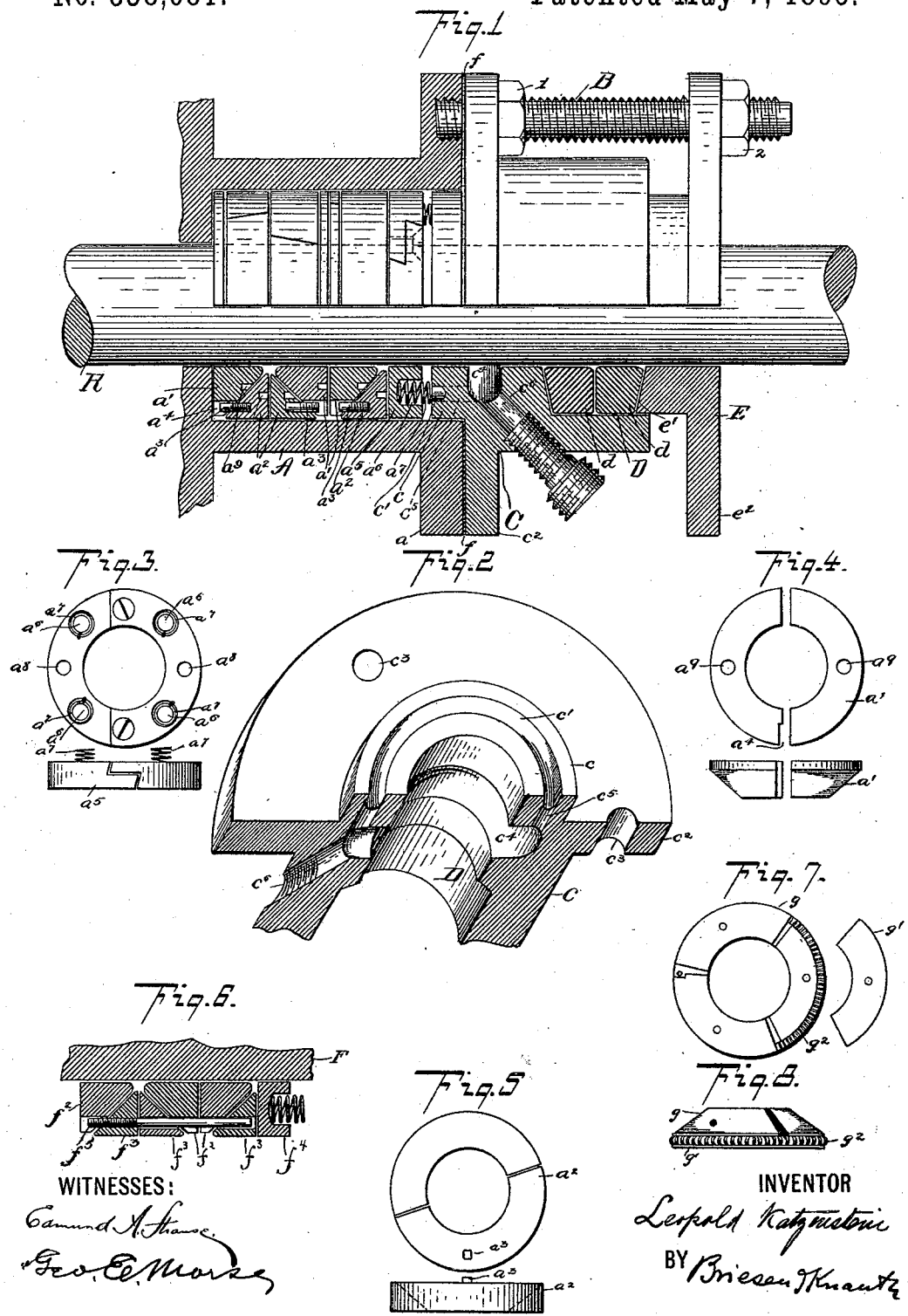
WITNESSES:
INVENTOR
Leopold Katzenstein
BY Briesen & Knauth
his ATTORNEYS.

UNITED STATES PATENT OFFICE.

LEOPOLD KATZENSTEIN, OF NEW YORK, N. Y.

STUFFING-BOX.

SPECIFICATION forming part of Letters Patent No. 538,681, dated May 7, 1895.

Application filed January 18, 1895. Serial No. 535,370. (No model.)

*To all whom it may concern:*

Be it known that I, LEOPOLD KATZENSTEIN, a resident of the city, county, and State of New York, have invented certain new and useful Improvements in Stuffing-Boxes, of which the following is a specification.

My invention relates to combination stuffing boxes, and has for its object to produce a stuffing box in which metallic packing is used, and which will prevent the escape of steam or other fluid from the cylinder.

To this end my invention consists in the construction hereinafter set forth and claimed.

My invention will be understood by reference to the accompanying drawings, in which—

Figure 1 is a detail view, partly broken away and in section, of a stuffing-box embodying my invention. Fig. 2 is a detail sectional view of a part thereof. Fig. 3 represents the spring-ring of the packing hereinafter described in plan and side view. Fig. 4 represents a single one of the split packing-rings in plan and side view. Fig. 5 represents another one of the split packing-rings in plan and side view, the same being a mate to the ring shown in Fig 4. Fig. 6 represents a fragmentary detail view of the packing, showing a modified arrangement of holding the split rings from rotation. Fig. 7 is a plan view showing a part detached of a modified form of split ring, and Fig. 8 is a side view thereof.

In the drawings, A is the main stuffing box and is provided with a flange $a$ which is tapped for the reception of screws B. This main stuffing box A is filled with split metallic rings $a'$ $a^2$ shown in detail in Figs. 4 and 5, which are mated or fitted together. These rings may be cut at two or more places and may be made in any desired number of parts, although I have for the purposes of convenience shown the rings as in but two parts. One of each of these mated rings as $a^2$ may be provided with one or more pins as $a^3$, and the other ring as $a'$ with a slot $a^4$. The rings may also be provided with suitable holes $a^9$ for the insertion of a tool to lift the rings out of the stuffing box. The pins of the one ring engage in the slots of the other ring and serve to hold the rings together to prevent the parts from turning one on the other, and prevent the joints from coming in one line when the piston-rod is working in the packing. Any number of these pairs of mated rings may be used and adjacent pairs may be connected one to another by pins entering slots or holes in the rings, as designated in the drawings.

Surmounting the metallic packing rings $a'$ $a^2$ is a sectional metallic ring $a^5$ in which are cut recesses $a^6$ in which springs $a^7$ are seated. This structure is shown in detail in Fig. 3, but it will be understood that instead of making this sectional ring in two parts, I may make it in three or more parts and may provide the ring with one or more holes $a^8$ for the purpose of engaging a tool therewith and lifting the ring out of the stuffing box.

C is an auxiliary gland which is provided with an annular boss $c$ in which is a groove $c'$ and with a flange $c^2$ provided with perforations as $c^3$. This auxiliary gland is bored axially and the gland is placed upon the main stuffing box A, the flange $c^2$ resting upon the flange $a$ of the main stuffing box and the annular boss $c$ being entered into the main stuffing box and resting upon the springs $a^7$ of the sectional spring ring $a^5$.

In addition to the features heretofore described, the auxiliary gland C is turned out to form a circumferential drainage chamber $c^4$ which communicates with the groove $c'$ in the circumferential boss $c$ by passages $c^5$ $c^5$, the function and purpose whereof will be presently explained, and this drainage chamber $c^4$ in turn is emptied through a duct $c^6$. The auxiliary gland is also chambered to form an auxiliary stuffing box. This stuffing box is designated by the reference letter D and is packed with suitable soft or fibrous packing rings $d$, which rings may be of any desired material, texture, form or arrangement. The auxiliary stuffing box is surmounted by a gland E which is entered into the auxiliary stuffing box and is beveled off as at $e'$ to form a bearing for the packing rings $d$. The gland E is also provided with a flange $e^2$ which is perforated for the reception of the screw bolts B.

The manner of assembling the device is as follows: The metallic packing rings $a'$ $a^2$ are first put in place, and then the sectional spring packing ring $a^5$ is put in place, after disconnecting and then connecting same again, as shown in the drawings. A gasket $f$ is thereupon placed upon the flange $a$ and the auxiliary gland is then put in place and screwed down firmly by turning the nut or nuts $l$, it being understood that while but one screw bolt B is shown, several may be and actually are generally employed. The packing rings $d$ are then inserted and the whole packing surmounted by the gland E and then is screwed down.

The mode of operation of the form of my device illustrated in Figs. 1 to 5 inclusive and to which reference is hereby made, is as follows: The mated metallic packing rings $a'$ $a^2$ being held firmly together, will wedge one upon the other and form a tight joint for the rod R to work in, but at the same time by virtue of elasticity of the springs $a^7$, the metallic packing rings will not be held rigidly together, but will be allowed to yield slightly so that the shock occasioned by the movement of the rod will be taken up by the springs and will not tend to rack the packing. It will thus be observed that the metallic packing rings form a yielding instead of a rigid packing which is a result much to be desired in this class of device. The packing rings $d$ may be saturated, permeated or coated or otherwise provided with a suitable lubricant in order to lubricate the rod R, but the rod R may be lubricated from an external source or sources, if desired. It will be quite apparent that as the rod reciprocates, there will be a slight escape of steam and water carried along by the rod, which phenomenon is known as spitting, especially in view of the fact that the metallic packing is on the steam side of the stuffing box, and in order to prevent this spitting from wetting the packing $d$ or being projected out from the farther end of the stuffing box between the gland E and the rod R, I have provided a circumferential drainage chamber $c^4$ in which the water and steam will be caught, part being received direct as it is carried along by the rod, and part being received from the main stuffing box A in which the metallic packing rings are located, whence it travels into the groove $c'$ of the circumferential boss $c$ and thence by passages $c^5$ into the drainage chamber $c^4$, whence it is removed through the duct $c^6$.

In the modification shown in Fig. 6, F is a part of the wall of the main stuffing box in which are contained the usual metallic packing rings $f^2$, $f^3$, a sectional spring ring $f^4$, but in this modification, instead of using separate pins between the pairs of rings, a single pin $f^5$ may be used to unite all the rings and prevent them from turning.

In the modification shown in Fig. 7, I have illustrated a three part ring $g$, one of whose sections $g'$ is held in place by means of a spring ring $g^2$ which surrounds and lies in a recess in the ring.

It will be quite obvious that these modified forms of rings and fastenings may be used interchangeably in the packing.

It will likewise be obvious that while for the purposes of clearness I have illustrated and minutely described several forms of packing rings, I would have it understood that I do not thereby mean to limit myself to the forms thus shown and described, as they may be greatly varied without departing from the spirit of my invention, but

What I claim, and desire to secure by Letters Patent, is—

The combination of a main stuffing box, superposed sectional wedge shaped packing rings contained therein, a separate auxiliary stuffing box carried by an independent section outside of the main stuffing box, the independent section carrying the auxiliary stuffing box being provided with an annular boss or gland adapted to enter the main stuffing box, and hold the packing rings in place, a circumferential groove or conduit in the face of said gland, a circumferential chamber adjacent to the rod and interposed between the main and auxiliary stuffing boxes, ducts forming a communication between the groove in the gland and the circumferential chamber and an outlet pipe connected with the circumferential chamber substantially as described and for the purposes specified.

LEOPOLD KATZENSTEIN.

Witnesses:
HARRY M. TURK,
GEO. E. MORSE.